July 14, 1953  F. J. JONES  2,645,074
ADJUSTABLE REEL-TYPE HEDGE TRIMMER
Filed Feb. 15, 1951  2 Sheets-Sheet 1

INVENTOR.
FRANK J. JONES,
BY: Harold B. Hood
ATTORNEY.

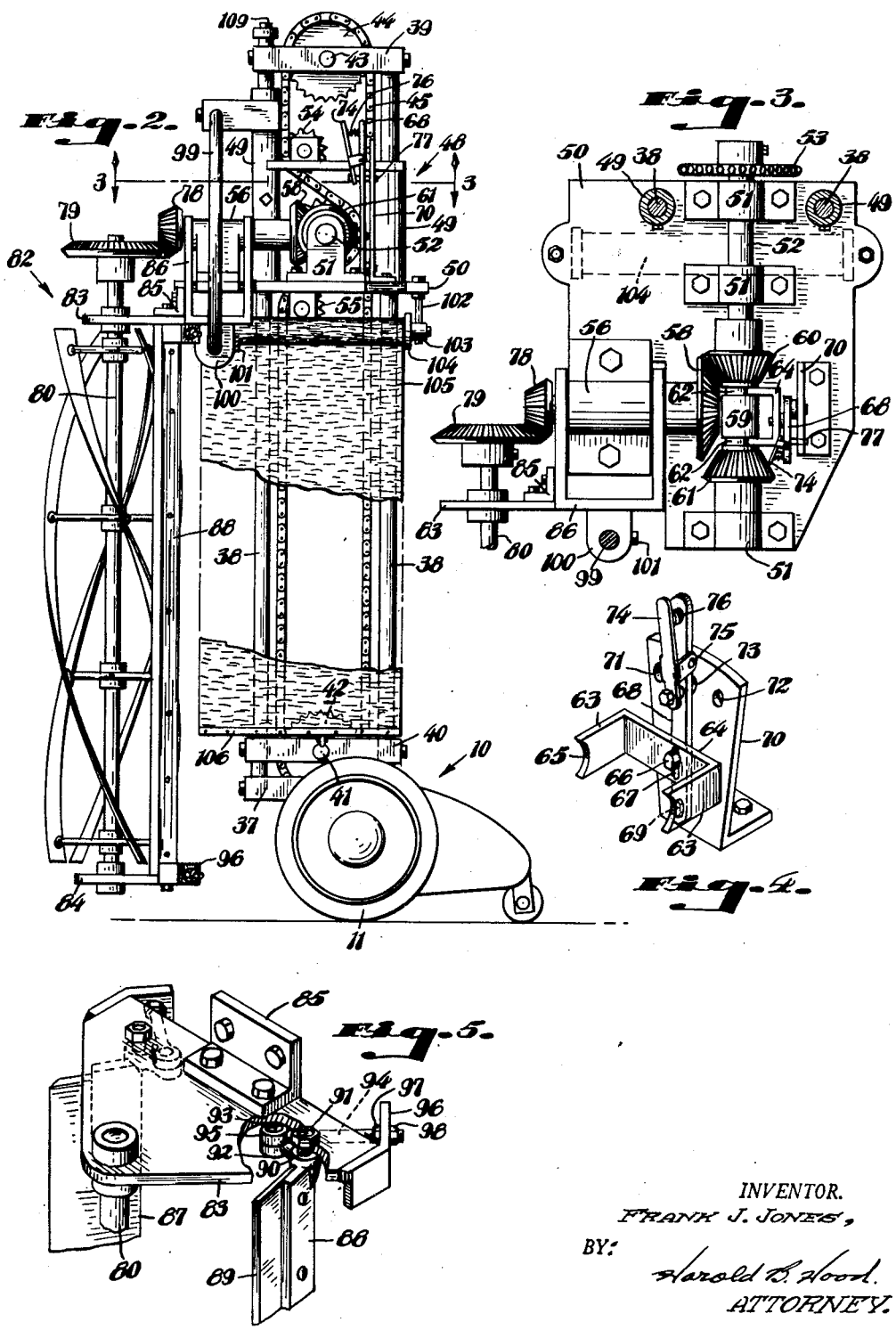

Patented July 14, 1953

2,645,074

UNITED STATES PATENT OFFICE 2,645,074

ADJUSTABLE REEL-TYPE HEDGE TRIMMER

Frank J. Jones, West Terre Haute, Ind., assignor of one-sixth to Luther Selvia and one-sixth to George W. Nisbet, both of West Terre Haute, Ind.

Application February 15, 1951, Serial No. 211,113

10 Claims. (Cl. 56—26)

The present invention relates to a hedge trimmer, and the primary object of the invention is to provide a novel device, adapted to be carried upon a wheeled frame which may preferably be the frame of a power-driven lawn mower of more or less conventional design. An object of the invention is to provide novel means for mounting a hedge trimmer unit upon such a frame in such a fashion as to permit a wide range of positional adjustment of the cutter unit, in order that any one of many desired shapes may be imparted to the hedge to be trimmed. A further object of the invention is to provide novel means for transmitting power to a cutter unit thus mounted for widely flexible adjustment.

A still further object of the invention is to provide an improved means for adjustably mounting such a cutter unit in such a fashion that the elevation of the unit, relative to the surface upon which the main frame travels, and the angular relation of such a unit with respect to such a frame, may be adjusted through a wide range, all without affecting the means provided for transmitting power to such unit from a prime mover fixedly mounted on the frame.

A still further object of the invention is to provide means which, once set, will require no further attention, for guarding the moving parts of the power transmitting train against cuttings thrown from the cutter unit.

A still further object of the invention is to provide, in connection with the objects above stated, means whereby a reversible reel-type cutter may be used to do the trimming.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 2 is a fragmentary side elevation of the machine illustrated in Fig. 1;

Fig. 3 is a horizontal section, drawn to a slightly enlarged scale and taken substantially on the line 3, 3 of Fig. 2 with the cutter unit fragmentarily shown and moved through an angle of 90° from the position of Fig. 1;

Fig. 4 is an enlarged perspective of a control detail;

Fig. 5 is an enlarged perspective view with parts broken away showing the adjustable mounting of the shear blades forming a part of the cutter unit; and Figs. 6, 7 and 8 are reduced, diagrammatic front elevations of the machine, showing the flexibility of the cutter unit and the manner in which it may be used to trim various sizes and shapes of hedges, or the like.

Figure 1:
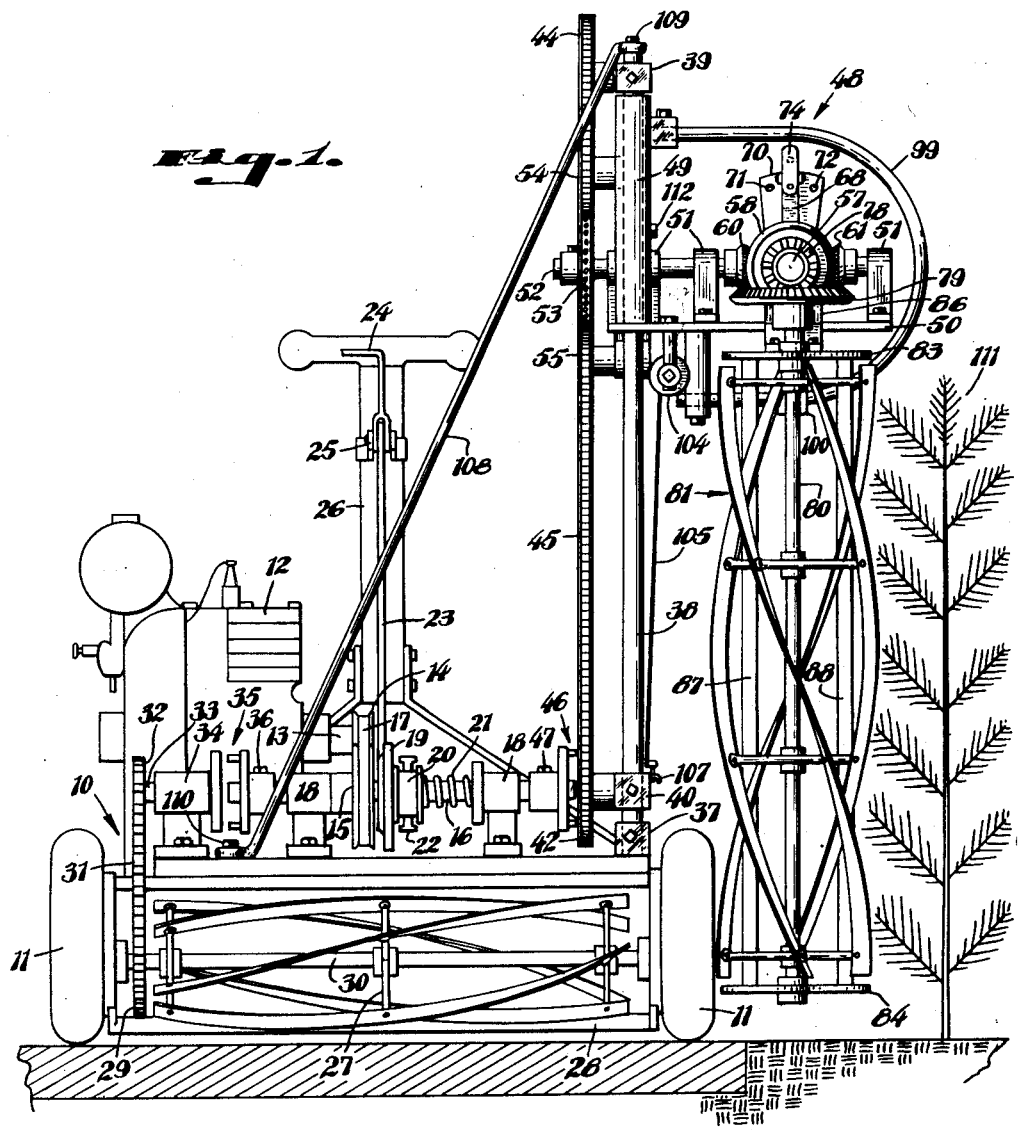
Fig. 1 is a front elevation of a hedge trimmer constructed in accordance with the present invention, shown in one position of use relative to a hedge to be trimmed.

Referring more particularly to the drawings, a conventional wheeled power lawn mower frame is indicated generally by the reference numeral 10, said frame being mounted upon wheels 11, 11 and fixedly supporting a gasoline engine or other prime mover 12 having a power delivery shaft 13. A pulley 14 mounted on the shaft 13 drives a pulley 15 loosely mounted on a shaft 16, through a belt 17. The shaft 16 is journalled in bearings 18, 18 spaced laterally of the frame, and said shaft extends transversely of the frame, as is clearly shown in Fig. 1.

A clutch element 19, splined to the shaft 16, includes an annularly grooved collar 20 against which bears a spring 21 urging said clutch element 19 into clutching engagement with the pulley 15 for driving the shaft 16. A yoke 22 cooperates with the collar 20, and a rod 23 is operatively connected to the yoke 22 to control the position of the clutch element 19 relative to the pulley 15 in response to movement of an operating handle 24 pivoted at 25 on the conventional frame handle 26. The details of the means for operating the clutch element 19 form no part of the present invention and therefore are not specifically disclosed. Suffice it to say that, in one position of the handle 24, the element 19 will be held in clutching engagement with the pulley 15 by the spring 21; while, in another position of said handle, the yoke 22 will hold the member 19, against the tendency of the spring 21, out of clutching engagement with the pulley 15.

As shown, a conventional grass cutting reel 27 is mounted upon the frame for cooperation with a shear blade 28 extending transversely of the frame; and a sprocket 29 fixed to the axle 30 of the reel 27, is adapted to be driven, by a chain 31, from a sprocket 32 carried on a shaft 33 journalled in a bearing 34, said shaft 33 being coaxially arranged adjacent one end of the shaft 16. A clutch 35 comprises an element carried upon the shaft 33 and a cooperative element mounted for axial adjustment upon the shaft 16, the latter element being shiftable from its illustrated position into driving engagement with the clutch element on the shaft 33, and being adapted to be secured in either of its positions of adjustment, relative to the shaft 16, by a set screw 36 or the like. Obviously, when the clutch 35 is engaged, rotation of the shaft 16 will drive the reel 27 in a manner well understood in the art.

Adjacent the opposite end of the frame 10 there is fixedly secured to said frame, by any desired means, a block 37 elongated in the direction of travel of the machine; and said block 37 is formed with two upwardly-opening sockets in which are received the lower ends of a pair of members 38, 38 providing an upstanding trackway. Said trackway elements may be secured in the sockets of the block 37 by set screws or other desired means. As is most clearly shown in Fig. 2, the trackway elements 38, 38 are substantially vertical and parallel with each other; and their upper ends are joined by a block 39 suitably secured to the elements 38, 38. A block 40 spans the elements 38, 38 adjacent their lower ends and is suitably secured thereto to provide a journal mounting for a stub shaft 41 upon which is mounted a sprocket 42. The block 39 mounts a similar stub shaft 43 upon which is carried a sprocket 44 coplanar with the sprocket 42; and a chain 45 is trained over the sprockets 42 and 44.

A clutch 46, similar to the clutch 35, comprises means fixed to rotate with the sprocket 42 and an element axially adjustably mounted on the adjacent end of the shaft 16 and movable into and out of driving engagement with the sprocket 42, said shiftable element being adapted to be secured in either of its positions of adjustment, relative to the shaft 16, by a set screw 47 or equivalent means.

It may be mentioned here that, in some installations, belt and pulley drive means and chain and sprocket drive means may be considered to be equivalent.

An auxiliary frame, indicated generally by the reference numeral 48, is mounted for adjustable movement along the trackway elements 38, 38. As shown, said auxiliary frame comprises tubular elements 49, 49 respectively slidably mounted upon the elements 38, 38 and fixedly secured to a platform 50 projecting horizontally from the vertical plane of the trackway. In bearings 51, 51, a shaft 52 is journalled for rotation upon an axis substantially perpendicular to the trackway plane; and said shaft 52 carries a sprocket 53 in the plane of the sprockets 42 and 44. As is most clearly shown in Fig. 2, one reach of the chain 45 is trained around that portion of the periphery of the sprocket 53 nearer the line of travel of the other reach of the chain; and the first-mentioned chain reach is supported, above and below the sprocket 53, upon idler sprockets 54 and 55 journalled in suitable bearings carried on the auxiliary frame 48.

In a further bearing 56 carried upon the platform 50 there is journalled a shaft 57 (Fig. 1) upon an axis perpendicular to the axis of the shaft 52; and at its end adjacent the shaft 52, the shaft 57 carries a bevelled gear 58.

Splined to the shaft 52 for axial adjustment relative thereto is an element 59 carrying two axially-spaced, mutually-facing bevelled gears 60 and 61. Said gears 60 and 61 are located on opposite sides of the axis of the shaft 57, and are so spaced that, in an intermediate position of the element 59, neither of said gears 60 and 61 has meshing engagement with the gear 58. Grooves 62, 62 in the element 59 are entered by spaced arms 63, 63 of a shifter element 64, the extremities of said arms being concavely radiused as indicated at 65 in Fig. 4 for optimum cooperative engagement with the element 59. The shifter element 64 is carried upon a pin 66 penetrating an elongated slot 67 in a lever 68 pivoted at 69 upon a bracket 70 upstanding from the platform 50, so that said element 64 will be rectilinearly shifted, in the direction of the axis of the shaft 52, by swinging movement of the lever 68. The bracket 70 is formed with three spaced perforations 71, 72 and 73, and a thumb piece 74, pivoted at 75 on the lever 68, is urged by a spring 76 to project a pin 77 (Figs. 2 and 3) through any one of said perforations with which said pin is brought into registry, to retain the lever 68 in a selected position of adjustment.

The parts are so proportioned and designed that, when the pin 77 is located in the perforation 73, the element 59 will be held in its neutral position in which neither gear 60 and 61 meshes with the gear 58; when the pin 77 is in the perforation 71, the gear 61 will be meshed with the gear 58; and when the pin 77 is engaged in the perforation 72, the gear 60 will be meshed with the gear 58.

At its opposite end, and overhanging the platform 50, the shaft 57 carries a bevelled gear 78 meshing with a bevelled gear 79 fixed to the axle 80 of a reel 81 forming an element of a cutter unit indicated generally by the reference numeral 82. Said cutter unit comprises end plates 83 and 84 in which the axle 80 is journalled, said axle being suitably held against axial movement relative to said plates. A bracket 85 supports the end plate 83 from a swinging yoke 86 journalled upon the shaft 57. As shown, the yoke 86 includes parallel arms snugly engaging opposite ends of the bearing 56 to hold said yoke against axial movement relative to the shaft 57 upon which it swings freely. The platform 50 is suitably slotted to accommodate movement of the yoke 86.

The cutter unit further comprises shear blades 87 and 88 supported upon and spanning said end plates 83 and 84, and being adapted for cooperation with the blades of the reel 81. The reason for the provision of two shear blades will appear hereinafter.

The blades 87 and 88 are identical, but allochirally arranged, and each comprises a sharpened edge 89, said blades being peripherally spaced from each other, relative to the reel 81, by less than 180°, and their sharpened edges being directed away from each other, as is most clearly to be seen in Figs. 1, 2 and 5. Each such blade is provided with a pair of pintles 90 projecting oppositely longitudinally therefrom substantially in alignment with its edge remote from the sharpened edge 89, and said pintles are oscillably mounted in aligned perforations in the end plates 83 and 84, being secured in place by means of nuts 91, or other equivalent fastening means, mounted upon the projecting ends of the pintles and bearing against the outer surfaces of the plates 83 and 84. Adjacent one or both pintles, each shear blade is provided with a radially-projecting arm 92 from which extends a trunnion 93 substantially parallel with the pintle 90; and an eye bolt 94 is provided for each such arm, the eye 95 of such eye bolt receiving the trunnion 93 to provide a pivotal connection between the eye bolt and the arm 92. The shank of each bolt is projected through a perforation in a bracket element 96, fixed with respect to the associated end plate; and nuts 97 and 98 are threadedly mounted on said shank to engage opposite surfaces of the bracket means, whereby said eye bolt, and consequently the shear blade, may be positively shifted incrementally in either direction.

The auxiliary frame 48 carries a U-shaped guide 99 upon which is slidably engaged a stud or block 100 fixed with respect to the yoke 86. Since the cutter unit 82 is carried from the yoke 86 which is journalled for movement about the axis of the shaft 57, the entire unit will swing upon that axis, the block 100 following the curvature of the guide 99 which is concentric with the shaft 57. The block 100 carries a set screw 101, or other equivalent means, engageable with the guide 99, at any position of adjustment of the cutter unit 82, to retain the said unit in any such position. A pair of studs 102 (Figs. 1 and 2) depend from the platform to support a rod 103 upon which is rotatably journalled a roller 104. A flexible shield 105 is rolled upon the roller 104, one end of said shield being anchored to the roller and the other end 106 being free. The block 40, or some other element on the frame, carries a hook 107 or equivalent means to which the free end 106 of the shield 105 may be anchored. Spring means (not shown) similar to that embodied in the well known window shade roller, but without the centrifugal latch means usually found in a window shade assembly, is associated with the shaft 103 and roller 104 and tends to drive the roller in a direction to reel in the shield or apron 105. Thus, if the auxiliary frame 48 is moved downwardly from its position illustrated in Fig. 1, the roller 104 will reel in the shield 105 to keep that shield in taut condition between the cutter unit 82 and the chain, clutches and associated elements of the drive mechanism.

Preferably, but not necessarily, a brace rod 108 will have one end anchored at 109 upon the upper end of the trackway 38, 38 and will have its opposite end anchored, at a transversely-spaced point 110, to the main frame 10.

Whenever the clutch element 19 is engaged with the pulley 15, the shaft 16 will be driven by operation of the engine 12. Clutches 35 and 46 may be concurrently engaged or disengaged, or one may be engaged while the other is disengaged; and whenever the clutch 35 is engaged, the reel 27 will be driven by rotation of shaft 16, while the reel 81 will be driven from shaft 16 whenever the clutch 46 is engaged.

With the parts in the positions of Fig. 1, the reel 81, when driven, will cooperate with the shear blade 88 to trim a hedge or the like 111 upon a vertical plane, the reel blades striking twigs of the hedge and drawing them against the shear blade 88 to cut them.

Figures 6, 7, 8:
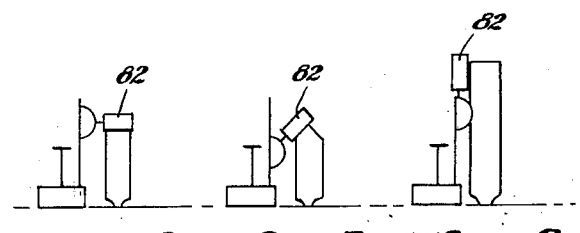

If it is desired to trim the top of such a hedge in a horizontal plane, as suggested diagrammatically in Fig. 6, the set screw 101 will be loosened, and the cutter unit 82 will be swung about the axis of the shaft 57 with which the yoke 86 is engaged, until the axle 80 is brought into a horizontal plane. Since the entire unit moves about the axis of the shaft 57, of course the relation between the gears 78 and 79 will not be disturbed, the gear 79 travelling about the axis of the gear 78. With the axle 80 in its new position, the set screw 101 is again tightened to hold the cutter unit in that position. Now, set screw 112 associated with one or both of the sleeves 49 will be loosened, and the entire auxiliary frame will be adjusted vertically upon the trackway 38, 38 to bring the shear blade 87 into the horizontal plane to which the top of the hedge 111 is to be trimmed. As the auxiliary frame 48 moves downwardly, if we assume that the chain 45 is held against travel, the sprocket 53 will be rotated by the movement of its axis past the stationary chain; but if the lever 68 is in the position of Fig. 4, the shaft 52 will rotate without affecting the shaft 57. Alternatively, the clutch 46 may be disengaged during such movement of the auxiliary frame, in which case the chain will be bodily carried along with the sprocket 53.

If, alternatively, it is desired to trim the upper portion of the hedge in an inclined plane, as indicated in Fig. 7, the cutter unit 81 may be swung still farther in a counter-clockwise direction about the axis of the shaft 57 and locked in a position such as that illustrated in Fig. 7. The vertical position of the plane to which the hedge is to be trimmed will, of course, be determined by the setting of the auxiliary frame relative to the trackway 38.

When a vertical plane is to be produced on a hedge which is higher than the position of the plate 83 when the parts are arranged in the manner illustrated in Fig. 1, the cutter unit 82 may be swung to a position in which the axle 80 is vertically arranged above the axis of the shaft 57, as indicated in Fig. 8. The extent of the trackway 38 is such that, by adjustment of the auxiliary frame 48, the end plate 83 of the cutter unit may be disposed with said unit in the relation of Fig. 8, in a plane lower than that occupied by said plate when the parts are arranged as illustrated in Fig. 1, so that the whole vertical surface of a hedge may be trimmed by proper adjustments of the disclosed apparatus.

Obviously, one pass of the machine will ordinarily be sufficient to complete the trimming of one surface of a hedge; and, in the embodiment of the invention illustrated, the grass alongside the hedge may be simultaneously mowed.

I claim as my invention:

1. A hedge trimmer or the like, comprising a wheeled frame, an upstanding trackway carried on said frame, an auxiliary frame reciprocably guided on said trackway, a U-shaped guide bar carried by said auxiliary frame and projecting laterally therefrom and lying in a substantially vertical plane, a shaft journalled on said auxiliary frame upon an axis substantially perpendicular to said plane, a cutter unit mounted on said auxiliary frame for adjustment about the axis of said shaft and including a rotatable bladed reel, a guide block carried by said cutter unit and slidably sleeved on said guide for guiding said unit in such adjustment, means carried by said block and engaging said guide to retain said cutter unit in a selected position of adjustment, means for driving said shaft, and means providing an operative driving connection between said shaft and said reel.

2. A hedge trimmer or the like, comprising a wheeled frame, a prime mover supported on said frame, an upstanding trackway carried on said frame, an auxiliary frame reciprocably guided on said trackway, a U-shaped guide bar carried by said auxiliary frame and projecting laterally therefrom and lying in a substantially vertical plane, a shaft journalled on said auxiliary frame upon an axis substantially perpendicular to said plane, a cutting unit mounted on said auxiliary frame for adjustment about the axis of said shaft and including a rotatable bladed reel, a guide block carried by said cutter unit and slidably sleeved on said guide for guiding said unit in such adjustment; means carried by said block and engaging said guide to retain said cutter unit in a selected position of adjustment; means operatively connecting said prime mover to drive said shaft; and means providing an operative connection between said shaft and said reel.

3. A hedge trimmer or the like, comprising a wheeled frame, a prime mover supported on said frame, an upstanding trackway carried by said frame, an auxiliary frame reciprocably guided on said trackway, a cutter unit carried by said auxiliary frame and including a rotary element, bearing means fixed with respect to said frame, a first shaft journalled in said bearing means, a sprocket fixed to said shaft, bearing means fixed with respect to said auxiliary frame, a second shaft journalled in said last-named bearing means, and operatively connected to drive said rotary element of said cutter unit, a second sprocket drivingly connected to said second shaft, a third sprocket carried adjacent the uppermost end of said trackway, an endless chain trained about said first and third sprockets and drivingly engaging said second sprocket, and means connecting said prime mover to drive said first shaft.

4. The machine of claim 3 in which the axes of said sprockets are parallel, the operative connection between said second shaft and the rotary element of said cutter unit including a further shaft perpendicular to said second shaft, and means supporting said cutter unit from said auxiliary frame for bodily oscillation about the axis of said further shaft.

5. The machine of claim 4 including a drive train between said second shaft and said further shaft, said drive train including a bevelled gear on one of said shafts, two bevelled gears axially slidably keyed to the other of said shafts and located, respectively, on opposite sides of the axis of said first-named bevelled gear, and means for shifting said two gears simultaneously relative to said axis to engage the same alternatively with said first-named gear.

6. The machine of claim 5 in which the axial spacing between said two shiftable gears exceeds the diametrical dimension between the points of engagement thereof with said one gear, said shifting means comprising a lever operatively connected to said two gears and swingable about an axis to shift said gears, and means cooperative with said lever to hold the same selectively in either of two opposite positions, in either of which one only of said two gears is engaged with said one gear, or in an intermediate position in which neither of said two gears is engaged with said one gear.

7. The machine of claim 3 including a flexible shield, a roller on which said shield may be wound, means resiliently tending to rotate said roller to reel in said shield and wind the same on said roller, said shield being adapted to extend between a point fixed with respect to said frame and a point fixed with respect to said auxiliary frame, means providing a journal mounting for said roller on one of said frames, and means providing an anchorage for the free end of said shield on the other of said frames.

8. In a machine of the class described, a wheeled frame, a cutter unit supported from said frame for bodily movement relative thereto, said unit comprising relatively fixed end elements, a reel bridging the space between said end elements and mounted for rotation, relative to said end elements about its own axis, and two shear blades spanning said end elements, each of said shear blades having a sharpened edge disposed for cooperation with said reel, and said blades being spaced from each other, peripherally of said reel, by less than 180° with their edges directed away from each other.

9. The machine of claim 8 in which each of said shear blades is mounted to rock about an independent axis parallel with the axis of said reel to adjust its sharpened edge toward and away from said reel axis, and means for rocking each of said shear blades and for holding the same in a selected position of adjustment.

10. The machine of claim 9 in which each such shear blade adjusting means comprises an arm fixed to said blade adjacent each end of said blade, an eye bolt pivotally connected to each arm, bracket means adjacent each end of said blade and fixed with respect to said end elements, each eye bolt penetrating its associated bracket means, and two nuts threadedly mounted on each eye bolt and engageable, respectively, with opposed surfaces of the associated bracket means.

FRANK J. JONES.

References Cited in the file of this patent
UNITED STATES PATENTS

| Number | Name | Date |
|---|---|---|
| 625,688 | Kepner | May 23, 1899 |
| 722,371 | Linhoff | Mar. 10, 1903 |
| 957,620 | Michalka | May 10, 1910 |
| 1,839,009 | Bankson | Dec. 29, 1931 |
| 1,869,394 | Sikma | Aug. 2, 1932 |
| 2,082,610 | Bankson | June 1, 1937 |
| 2,161,357 | Kaplan | June 6, 1939 |